US006055734A

United States Patent [19]

McCurry et al.

[11] Patent Number: 6,055,734

[45] Date of Patent: May 2, 2000

[54] CIRCULAR SAW WITH BLADE VIEWING WINDOW

[75] Inventors: Ronald C. McCurry, West Union, S.C.; James B. Watson, Conyers, Ga.; Ernest Chandler Bostic, Easley, S.C.

[73] Assignee: Ryobi North America, Inc., Anderson, S.C.

[21] Appl. No.: 09/262,189

[22] Filed: Mar. 4, 1999

[51] Int. Cl.[7] .......... B23D 47/00

[52] U.S. Cl. .......... 30/391; 83/520

[58] Field of Search .......... 30/388, 390, 391; 83/520, 478

[56] References Cited

U.S. PATENT DOCUMENTS

| | | | |
|---|---|---|---|
| 1,830,579 | 11/1931 | Wappat | 30/391 |
| 2,795,248 | 6/1957 | Doerner | 30/391 |
| 4,450,627 | 5/1984 | Morimoto | 83/520 X |
| 5,911,482 | 6/1999 | Campbell et al. | 83/520 X |

FOREIGN PATENT DOCUMENTS

| | | |
|---|---|---|
| 0 810 070 A2 | 12/1997 | European Pat. Off. . |
| 0 810 071 A2 | 12/1997 | European Pat. Off. . |

*Primary Examiner*—Douglas D. Watts
*Attorney, Agent, or Firm*—Brooks & Kushman P.C.

[57] ABSTRACT

A hand held circular saw for a portable circular saw 10 in which a viewing cutout 34 is provided through the housing 12 between an electric motor 14 and a blade guard support member 19. A transparent chip shield 32 is attached to the housing 12 and is pivotable between an operating position covering the viewing aperture and a raised cleaning position. In the preferred embodiment, notch engaging bosses 48 provided on the chip shield engage notches 50 in the housing 12 to snap lock the chip shield in the operating position.

12 Claims, 4 Drawing Sheets

CIRCULAR SAW WITH BLADE VIEWING WINDOW

TECHNICAL FIELD

The invention is related to the field of hand held circular saws and in particular to a circular saw having a window which permits the user to see the cut line from the users natural position.

BACKGROUND ART

Circular saws are well known and widely used in the building trades. Currently when making a saw cut along a scribed or penciled line, the operator has to move his head from its natural position to the opposite side of the saw in order to see the alignment of the saw blade with the scribed line. For the most part, this places the operator in an unnatural position while sawing along the scribed line.

To overcome this problem, the prior art teaches the placing of a window along the leading edge of the stationary protective cover of the portable circular saw. Typical examples of such windows are taught by Morimato in U.S. Pat. No. 4,450,627, and by Campell in European Patent Applications EP 0810 070 and EP 0810 071. This window on the leading edge of the stationary protective shield is only a partial solution to the problem. The operator still must place his or her head over the protective shield in order to clearly see the alignment of the saw blade with the cutting line. Although this provides a substantial improvement, the placement of the operator's head over the protective cover is still unnatural for the operator.

A circular saw of the present invention has a window on the housing adjacent to the stationary protective cover which permits the operator to view the alignment between the saw blade and the cutting line from a natural position of the operator's head while the saw is in use.

SUMMARY OF THE INVENTION

The invention has a window located generally between the motor and the circular saw blade which permits the operator to view the alignment of the saw blade with a cut line without having to move his or her head from its normal operating position. The window is preferably pivotably mounted to the housing and is displaceable between an operating position and a raised cleaning position. A snap lock mechanism locks the chip shield in the operating position.

One object of the invention is a portable circular saw having a window permitting an operator to align the saw blade from a cut line without having to move his head from its normal location during a cutting operation.

Another object of the invention is to provide a window which is displaceable from a normal operating position to a raised position for cleaning.

These and other objects of the invention will become more apparent from a reading of the detailed description of the preferred embodiment in conjunction with the drawings.

BEST MODE FOR CARRYING OUT THE INVENTION

Figure 1:
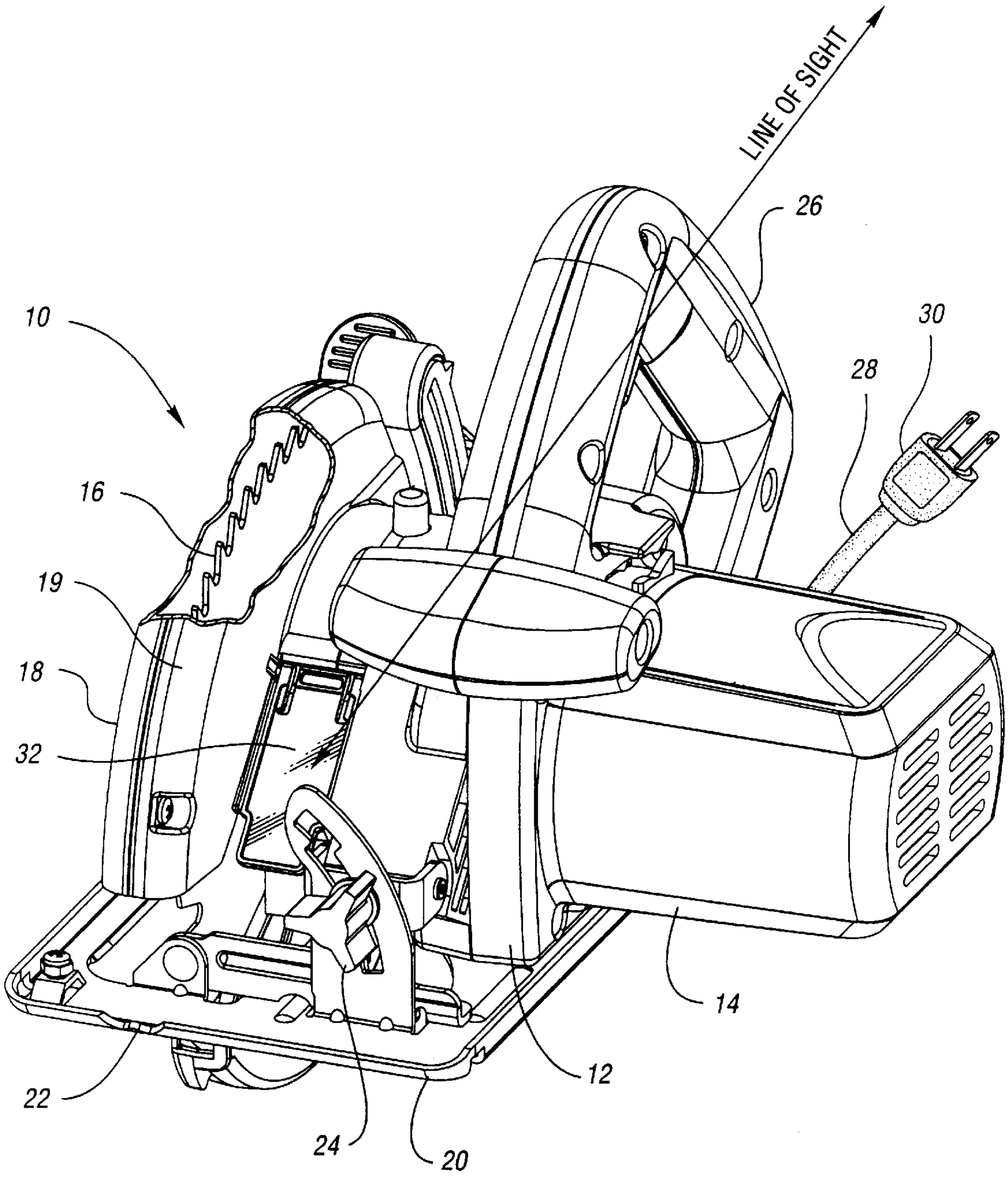
FIG. 1 is a perspective view of the portable circular saw with a chip shield window in the operating position.
Figure 2:
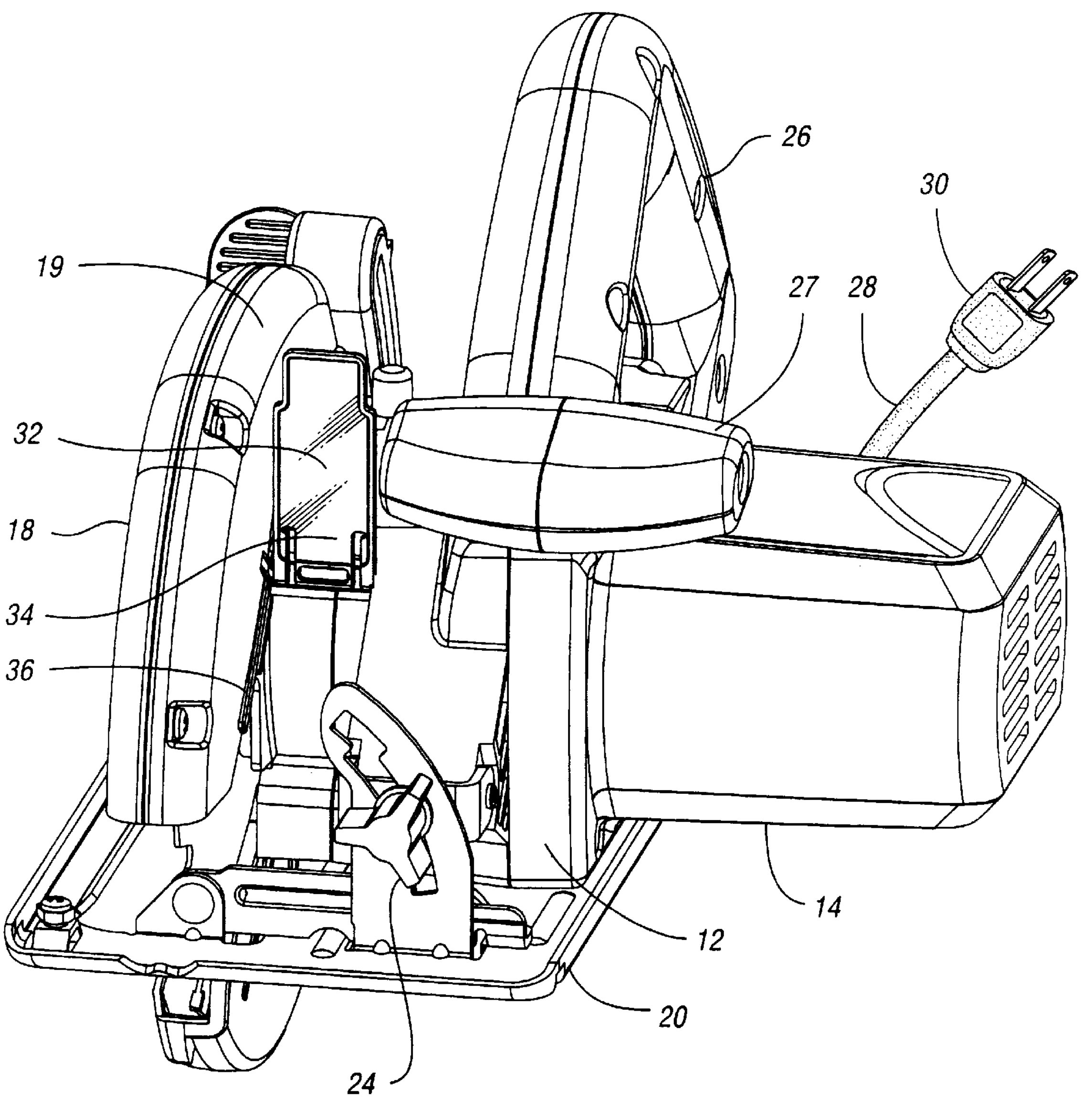
FIG. 2 is a perspective view of the portable circular saw with the chip shield window in the cleaning position.
Figure 7:
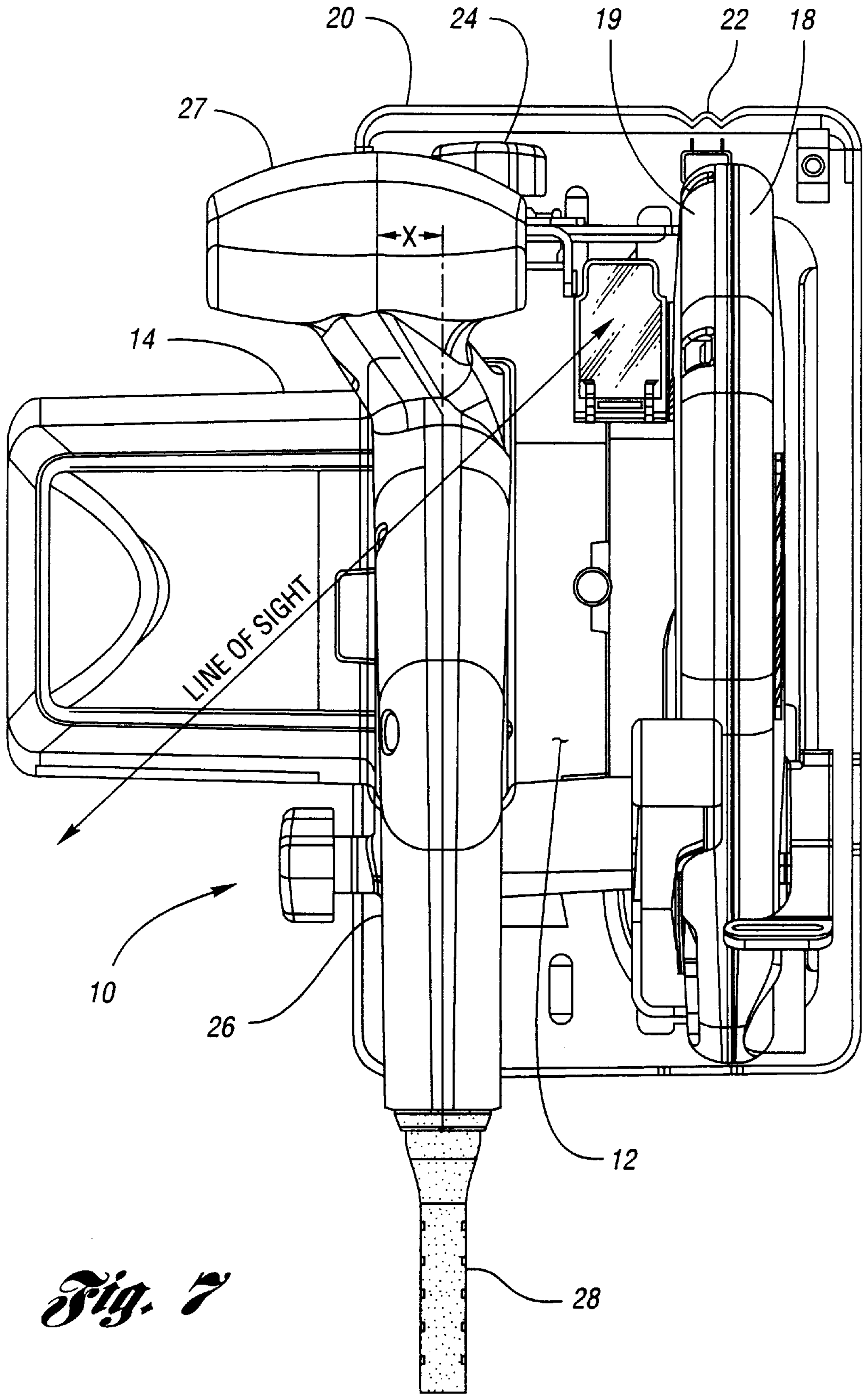
FIG. 7 is a top plan view of the portable circular saw.

A portable circular saw 10 is shown on FIGS. 1, 2 and 7. The portable circular saw 10 has a housing 12 enclosing an electric motor 14. A circular saw blade 16 is attached to a rotary output member of the motor 14. The upper portion of the circular saw blade 16 is covered by a stationary blade guard 18 which is attached to blade guard support member 19 of the housing 12. A base 20 having a guide notch 22 is pivotably attached to the housing 12 which permits the circular saw blade 16 to be inclined to the workpiece to be cut. A lock 24 secures the base 20 to the housing 14 at any desired inclination of the saw blade relative to the base 20 in a conventional manner. The housing 12 also includes a primary handle 26 which also incorporates a trigger or motor switch, not shown. Housing 12 also includes an auxiliary handle 27 which was mounted forward of primary handle 26 as illustrated in FIGS. 1, 2 and 7 and positioned laterally outboard (away from the saw blade) of the primary handle 26 by a distance X which is preferably 1 cm to 4 cm. Typically when the saw 10 is in use, the operator will place his or her right hand on the primary handle 26 with the operator's index finger adjacent the trigger and the user's left hand will be positioned on the auxiliary handle 27. The forward outboard orientation of auxiliary handle 27 relative to primary handle 26 enables the user to comfortably guide the saw, when in use, as well as to comfortably lift the saw into and out of engagement with a workpiece. The outboard orientation of auxiliary handle 27 further serves to provide a clear view of the saw blade and the scribe line formed on the workpiece to demark a desired path of cut.

In the illustrated embodiment, electrical power is provided to the motor by means of an electrical cord 28 having a male electrical plug 30 attachable to a conventional household electrical outlet. Alternatively, a battery powered version of the saw could be made using a rechargeable battery pack and a DC electric motor.

A rectangular transparent chip shield 32 is pivotably attached to the motor housing 12 between the blade guard support member 19 and the handle 26 adjacent to the forward cutting edge of the circular saw blade 16. The chip shield 32 is pivotable from a downward forwardly sloped operating position as shown in FIG. 1 to a raised cleaning position as shown in FIG. 2. The chip shield 32 is made from a transparent plastic material and has a generally elongated rectangular shape which forms a window through which the user of the saw can view the front edge of the saw. The transparent chip shield 32 covers a rectangular cutout 34 provided in the housing 12 adjacent to the leading edge of the saw blade 16 at a location where the saw blade 16 engages a workpiece. In the operating position the chip shield 32 is snap locked against a support rib 36 provided on opposite sides of the rectangular cutout 34.

Figure 3:
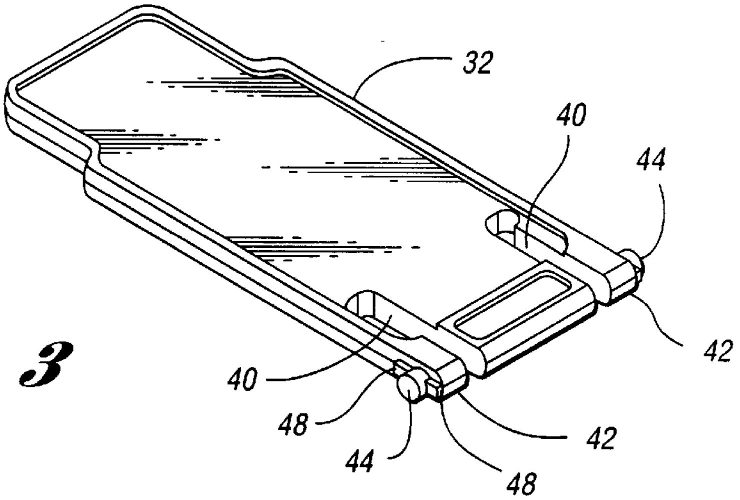
FIG. 3 is a perspective of the chip shield.window.

Referring to FIG. 3, the chip shield 32 has a pair of longitudinal slots 40 provided at one end which forms a pair of resilient longitudinally extending arms 42 on opposite sides thereof. A pair of pivot pins 44 extend outwardly near the end of each arm 42 which are receivable in pivot bores 46 shown on FIG. 4.

Figure 5:
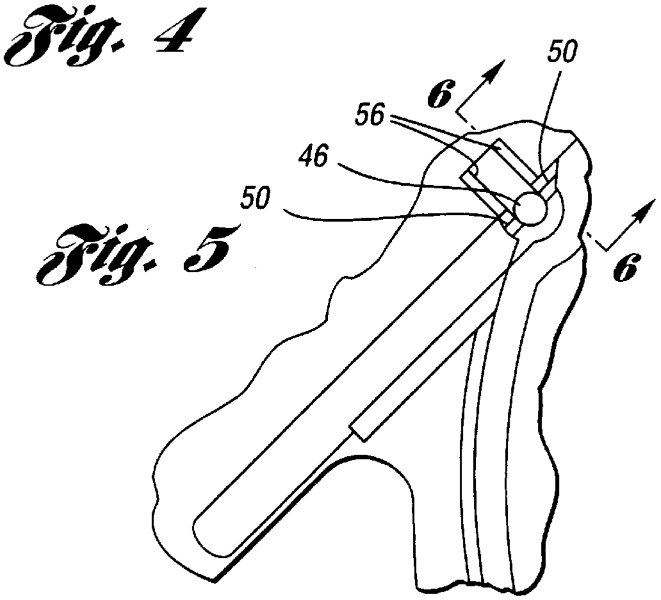
FIG. 5 is a blow-up of a portion of the blade guard support member.
Figure 6:
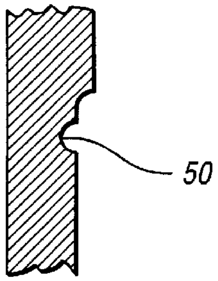
FIG. 6 is a partial cross-sectional view of the blade guard support member of FIG. 5 along section lines 6—6.

In the preferred embodiment, the chip shield 32 has a pair of longitudinal notch engagement bosses 48 provided on opposite sides of each pivot pin 44. The notch engagement bosses 48 snap fit into notches 50 provided in facing sides of the rectangular cutout 34 as shown on FIGS. 4, 5, and 6. Although the preferred embodiment has notch engagement bosses and notches provided on opposite sides of the chip shield 32 and the cutout 34 respectively, it is recognized that only one notch engagement boss 48 and only one notch 50 is required.

In the operating position of the chip shield 32 in which it covers the cutout 34, the arms 42 bias the notch engagement bosses 48 into the notches 50 snap locking the chip shield 32 against the support rib 36. This snap lock action maintains the chip shield 32 in the operating position. To clean the transparent chip shield 32, the operator grasps the end of the chip shield 32 at the end opposite the pivot pins 44 and rotates it to the raised cleaning position shown on FIG. 2. As the chip shield 32 is rotated, the notch engagement bosses 48 are displaced from the notches 50 which resiliently displaces the arms 42 inwardly towards each other. After cleaning the chip shield 32 is manually pivoted towards the operating position where the notch engagement bosses 48 once again engage the notches 50. In this position, the arms 42 are resiliently displaced outwardly snapping the notch engagement bosses 48 into the notches 50 locking the chip shield 32 in the operating position as shown on FIG. 1.

Figure 4:
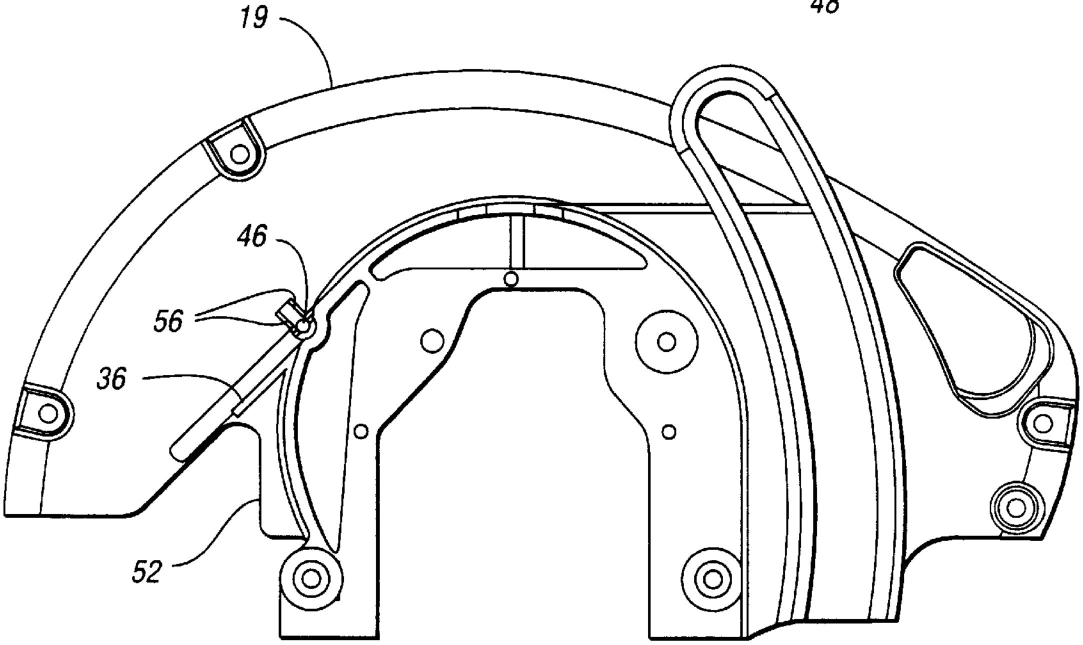
FIG. 4 is a side view of the blade guard support member of the saw's housing.

The alignment of the leading edge of the saw blade 16 relative to the cutting line through the chip shield 32 is facilitated by a viewing aperture 52 provided through the blade guard support 19 of the housing 12 on the side adjacent to the saw blade as shown on FIG. 4.

In the event the chip shield 32 becomes badly scratched or abraded, it may be removed by compressing the arms 42 towards each other displacing the pivot pins 44 from the pivot bores 46. This permits the chip shield 32 to be simply removed. To facilitate the installation of a new chip shield 32, a pair of pin slots 56 may be provided which guide the pivot pins 44 towards the pivot bores 46.

Having disclosed the location and details of the window relative to a specific circular saw configuration, it is recognized that certain changes and improvements may be made by those skilled in the art within the scope of the invention set forth in the appended claims.

What is claimed is:

1. A hand held circular saw having a circular saw blade driven by a rotary output member of an electric motor, and a housing with a motor housing portion enclosing the electric motor and a stationary blade guard housing portion enclosing an upper portion of the circular saw blade, the improvement comprising:

a cutout provided through the housing at a location laterally adjacent to the blade guard housing portion, the cutout providing visual access along a normal line of sight to an operator holding the circular saw in a typical operation position to a leading edge of the saw blade where the saw blade engages a work piece to be cut; and a transparent chip shield pivotably attached to the housing, the chip shield being pivotably displaceable relative to the housing between a downward forwardly sloped operating position and a raised cleaning position, in the operating position the chip shield being disposed over the cutout permitting the operator to view the alignment of the saw blade relative to the work piece through the transparent chip shield while limiting the discharge of chips in the direction of the user's line of sight.

2. The hand held circular saw of claim 1 wherein the cutout is a rectangular in shape in top plan view and wherein the transparent chip shield is a rectangular in shape and sized to fix within the cutout.

3. The hand held circular saw of claim 2 wherein the chip shield has a pair of pivot pins provided on opposite sides thereof and the housing has a pair of pivot bores provided on opposite sides of the rectangular cutout, each pivot bore respectfully receiving one of the pair of pivot pins.

4. The hand held circular saw of claim 3 wherein the pivot pins are provided on a pair of longitudinally extending arms and wherein the chip shield further includes at least one notch engagement boss associated with one of the pivot pins and wherein the housing has at least one notch receiving the at least one notch engagement boss when the chip shield is in the operating position.

5. The hand held circular saw of claim 4 wherein the at least one notch engagement boss comprises at least two notch engagement bosses, one provided on opposite sides of the pivot pin and the at least one notch comprises two notches provided on opposite sides of the pivot bore.

6. The hand held circular saw of claim 5 wherein each arm of the transparent chip shield has a pair of notch engagement bosses provided on opposite sides of each of the pivot pins and the housing has a pair of notches for receiving the notch engagement bosses adjacent to each of the at least two pivot bores when the chip shield is in the operating position, the notch engagement bosses received in the notches snap locking the chip shield in the operating position.

7. The hand held circular saw of claim 3 further including a detent for locking the chip shield in the operating position.

8. A hand held circular saw having a circular saw blade driven by a rotary output member of an electric motor, a housing with a motor housing portion enclosing the electric motor and a stationary blade guard housing portion enclosing an upper portion of the circular saw blade, and a primary handle affixed to the housing laterally to and inboard of the stationary blade guard portion to be grasped by the right hand of a operator, the improvement comprising:

a cutout provided through the housing between the primary handle and the stationary blade guard portion providing visual access along a normal line of sight, to the operator holding the circular saw in a typical operating position, to a leading edge of the saw blade where the saw blade engages a work piece to be cut;

a transparent chip shield pivotably attached to the housing, the chip pivotable between a downward forwardly sloped operating position disposed over the cutout permitting the operator to view the alignment of the saw blade relative to the work piece through the transparent chip shield while limiting the discharge of chips in the direction of the user's line of sight and a raised cleaning position; and an auxiliary handle to be grasped by the left hand of the operator, the auxiliary handle being fixed relative to the housing in an oriented forward of the primary handle, laterally inboard of the primary handle so that the operator's left hand may comfortably restrain the hand held circular saw without blocking the operator's view of the leading edge of the saw blade.

9. The hand held circular saw of claim 8 wherein the auxiliary handle is in lateral alignment with the leading edge of the saw blade.

10. The hand held circular saw of claim 9 wherein the auxiliary handle is generally T-shaped.

11. The hand held circular saw of claim 8 wherein the cutout is a rectangular in shape in top plan view and wherein the transparent chip shield is a rectangular in shape and sized to fix within the cutout.

12. The hand held circular saw of claim 8 further including a detent for locking the chip shield in the operating position.

* * * * *